United States Patent [19]

Katsu

[11] Patent Number: 5,253,148
[45] Date of Patent: Oct. 12, 1993

[54] ELECTRIC DOUBLE LAYER CAPACITOR

[75] Inventor: Keitaro Katsu, Tokyo, Japan

[73] Assignee: NEC Corporation, Japan

[21] Appl. No.: 837,801

[22] Filed: Feb. 18, 1992

[30] Foreign Application Priority Data

Mar. 1, 1991 [JP] Japan .................. 3-034901

[51] Int. Cl.5 .............. H01G 9/00; H01G 3/06
[52] U.S. Cl. .................. 361/539; 361/502; 29/25.03
[58] Field of Search ........... 361/306, 307, 310, 400, 361/402, 404, 405, 502, 535, 536, 538, 539, 540, 541; 29/25.42, 25.03

[56] References Cited

U.S. PATENT DOCUMENTS

| | | | |
|---|---|---|---|
| 4,107,762 | 8/1978 | Shirn et al. | 361/534 |
| 4,672,506 | 6/1987 | Deguchi et al. | 361/323 |
| 4,691,266 | 9/1987 | Yoshio | 361/502 |
| 4,731,705 | 3/1988 | Velasco et al. | 361/502 |
| 4,982,312 | 1/1991 | Shindo et al. | 361/527 |
| 5,093,762 | 3/1992 | Sato et al. | 361/502 |

Primary Examiner—Bruce A. Reynolds
Assistant Examiner—Michael D. Switzer
Attorney, Agent, or Firm—Laff, Whitesel, Conte & Saret

[57] ABSTRACT

The electric double layer capacitor is designed such that a pair of electrode plates each having a lead terminal portion are positioned on upper and lower faces of an electric double layer capacitor element, the resulting assembly is resin-molded with a heat-resistant resin while applying a desired pressure to the assembly through the upper and lower electrode plates and the lead terminal portions are formed into shapes having L-shaped sections. This structure makes it possible to easily provide chip type electric double layer capacitors capable of being surface-mounted.

7 Claims, 5 Drawing Sheets

ELECTRIC DOUBLE LAYER CAPACITOR

BACKGROUND OF THE INVENTION

1. Field of the Invention

The present invention relates to an electric double layer capacitor and more particularly to a chip type electric double layer capacitor.

2. Description of the Prior Art

As a means for obtaining a capacitor having a large capacitance while making use of an electric double layer capacitor, there has been known, as disclosed in U.S. Pat. No. 3,536,963, a capacitor having a large capacitance in which an electric double layer is formed by carbon powder coming into contact with an electrolyte as shown in FIG. 1.

FIG. 1 is a sectional view of a unitary electric double layer capacitor element 11 which comprises a pair of electronic conducting and ionic insulating separators 8, carbon paste electrodes 7 each comprising a mixture of activated carbon powder and an electrolyte and arranged between these two conductive separators 8, an ionic conducting and electronic insulating porous separator 9 which is positioned to prevent the electric conduction between the carbon paste electrodes 7 and non-conductive gaskets 10 for holding the carbon paste electrodes 7 and for isolating the electrodes from the outside.

In addition, FIG. 2 is a sectional view of a conventional electric double layer capacitor which comprises a stacked element 12 comprising a plurality of unitary elements 11 stacked together each of which has the same construction as that of the element 11 shown in FIG. 1, a conductive metal case 15 accomodating the stacked element 12 therein and an assembled electrode 14.

The assembled electrode 14 comprises an insulating case 13c for preventing short circuits between the inner wall of the conductive metal case 15 and the stacked element 12 and for covering the upper surface of the stacked element 12 and first and second electrode plates 13a and 13b. Each electrode plate has a lead terminal and is disposed on the upper or lower face of the upper portion of the insulating case 13c. In this electric double layer capacitor, a pressure ranging from 1 to 100 kg/cm$^2$ is applied to the stacked element 12, the pressure acting from its upper and lower sides. The capacitor assembly is sealed by inwardly caulking the open edge of the conductive metal case 15 while holding the pressure applied thereto in order to reduce the contact resistance in the carbon paste electrodes 7.

However, the aforementioned conventional electric double layer capacitors are limited in the directions in which lead terminals, may be drawn out which is peculiar to those comprising elements accomodated in metal cases. For this reason, these capacitors are inevitably in the self-supporting forms. Thus the surface-mounting thereof on, for instance, a printed circuit board is very difficult.

SUMMARY OF THE INVENTION

Accordingly, an object of the present invention is generally to eliminate the foregoing drawbacks associated with the conventional electric double layer capacitors and more specifically to provide a chip type electric double layer capacitor which effectively permits the surface-mounting.

The foregoing object of the present invention can effectively be achieved by providing an electric double layer capacitor which comprises an electric double layer capacitor element; a pair of electrode plates positioned on upper and lower faces of the electric double layer capacitor element and having lead terminal portions which protrude outwardly in the directions opposite to one another; and a resin package layer enclosing the element and the electrode plates except for the protruding lead terminal portions of the electrode plates.

The lead terminal portions of the electrode plates are preferably formed into shapes each having an L-shaped section to produce a chip type electric double layer capacitor.

In the present invention, the term "electric double layer capacitor element" means a single unitary electric double layer capacitor element and a stacked element comprising at least two unitary electric double layer capacitor elements and will hereinafter be simply referred to as a "(electric double layer capacitor) element".

BRIEF DESCRIPTION OF THE DRAWINGS

The aforementioned and other objects, features and advantages of the present invention will become more apparent from the following detailed description taken with reference to the accompanying drawings, wherein.

DESCRIPTION OF THE PREFERRED EMBODIMENTS

The chip type electric double layer capacitor according to the present invention will hereinafter be explained in more detail with reference to the accompanying drawings.

Figure 1:
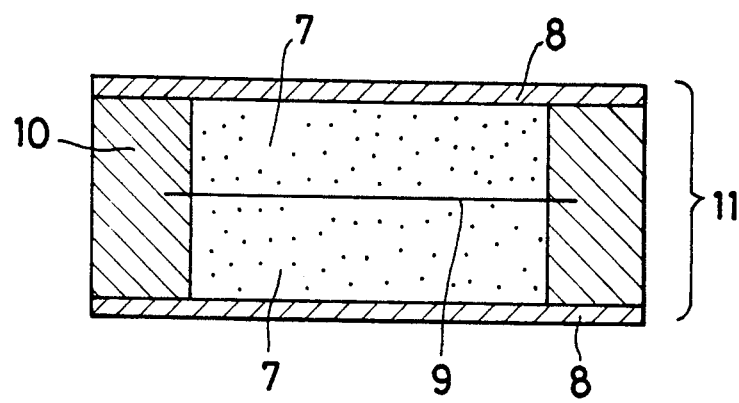
FIG. 1 is a longitudinal sectional view of a unitary electric double layer capacitor element.
Figure 2:
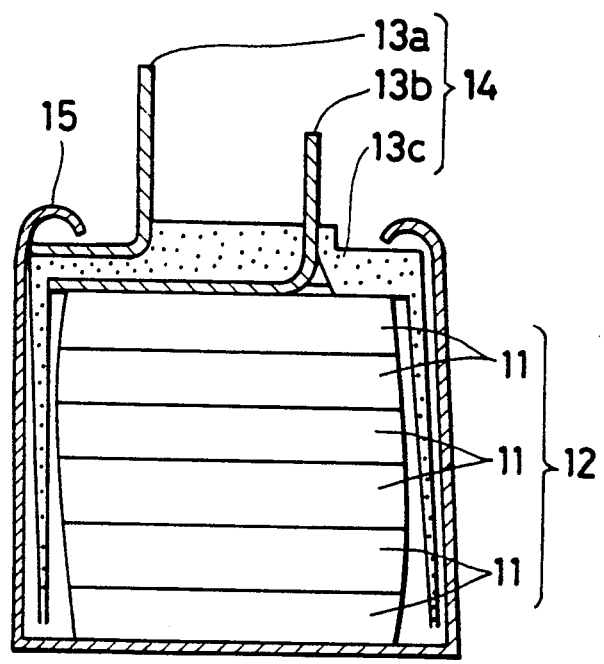
FIG. 2 is a sectional view of an embodiment of a conventional electric double layer capacitor.
Figure 3A:
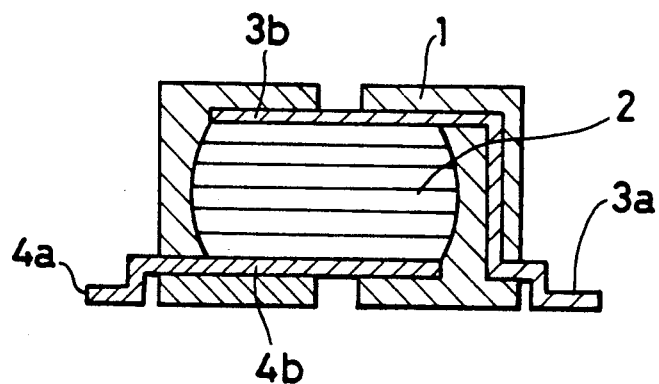
FIGS. 3a, 3b and 3c are, respectively, a sectional view, a plan view and a side view of an embodiment of the electric double layer capacitor according to the present invention.
Figure 3B:
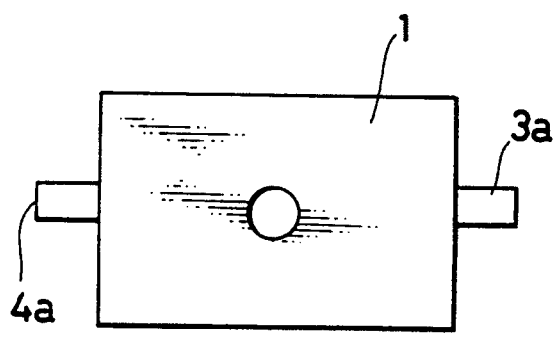
Figure 3C:
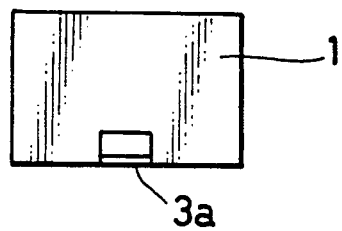
Figure 4A:
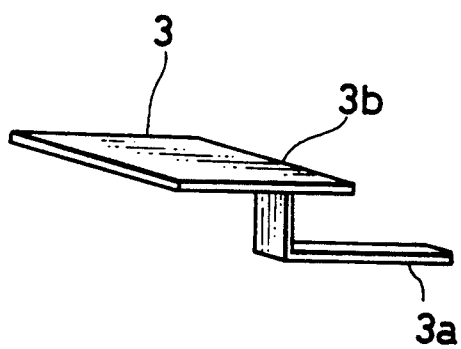
FIGS. 4a and 4b are perspective views showing upper and lower electrode plates for use in an embodiment of the capacitor of the present invention, respectively.
Figure 4B:
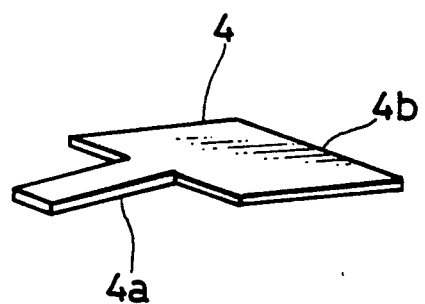
Figure 5A:
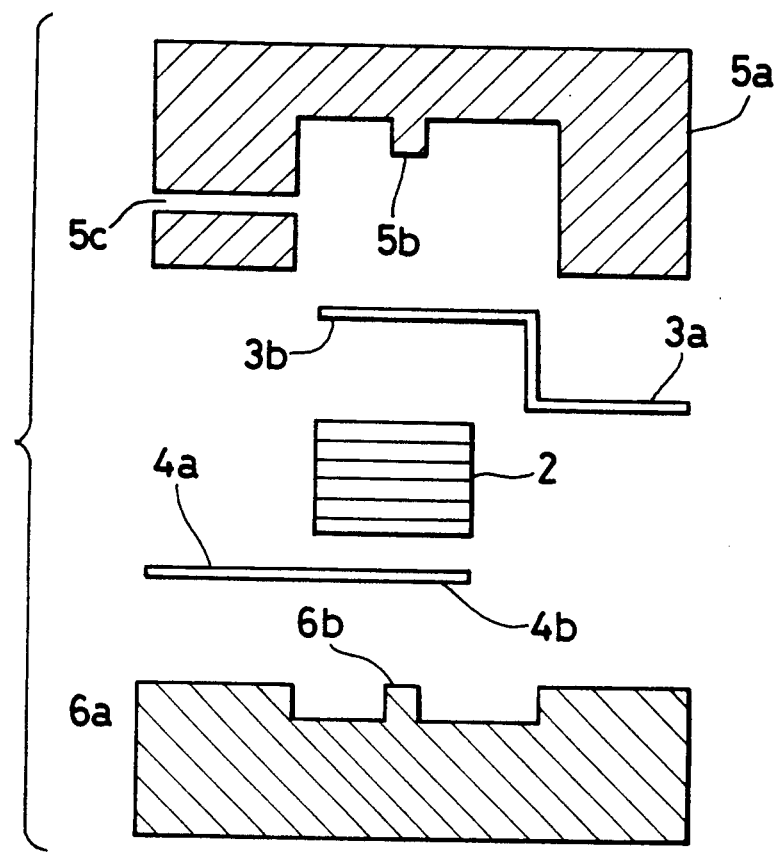
FIGS. 5a and 5b are sectional views each showing a condition of upper and lower electrode plates for use in an embodiment of the present invention and an electric double layer capacitor element prior to or after putting them in a mold for injection-molding observed when the embodiment of the present invention is injection-molded.
Figure 5B:
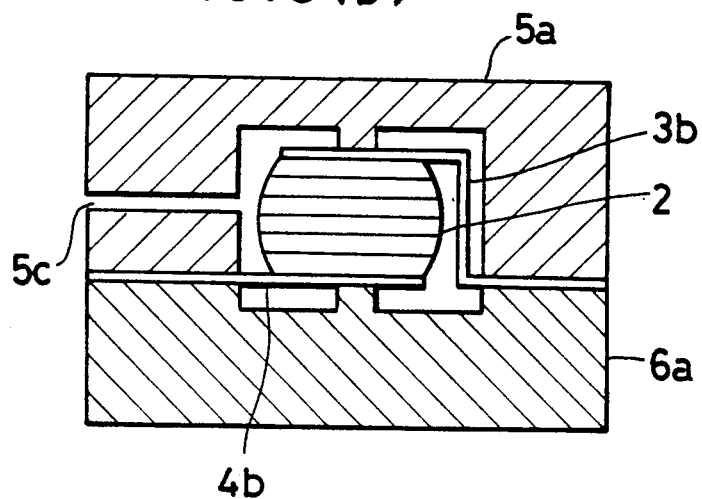

FIGS. 3a, 3b and 3c are, respectively, a sectional view, a plan view and a side view of an embodiment of the electric double layer capacitor of the present invention; FIGS. 4a and 4b are perspective views showing upper and lower electrode plates for use in the embodiment of the capacitor of the present invention, respectively; and FIGS. 5a and 5b are sectional views each showing a condition of upper and lower electrode plates for use in the embodiment of the present invention and the electric double layer capacitor element prior to or after putting them in a mold for injection-molding.

As seen from FIG. 3, the chip type electric double layer capacitor according to the present invention comprises an electric double layer capacitor element 2 (in this case a stacked element); a pair of electrode plates 3b and 4b (upper electrode plate 3b and lower electrode plate 4b) positioned on upper and lower faces of the electric double layer capacitor element 2 and having lead terminal portions 3a and 4a, respectively which are protruded outwardly in the directions opposite to one another, the protruded lead terminals having L-shaped sections; and a resin package layer 1.

The chip type electric double layer capacitor according to the present invention as shown in FIG. 3a can be produced as follows. The upper electrode 3 has the shape as shown in FIGS. 4a, 5a and 5b and more specifically the upper electrode 3 (having a thickness of, for instance, 0.2 mm) comprises, for instance, a square electrode (metal) plate 3b having a size of, for instance, 9 mm $\times$ 9 mm and a lead terminal portion 3a comprising a first portion downwardly extending from one side of the square and having a size of, for instance, 3 mm (length)$\times$2 mm (width), and a second portion outwardly and horizontally extending from the edge of the first portion and having a size of 8 mm (length)$\times$2 mm (width). On the other hand, the lower electrode 4 has the shape as shown in FIGS. 4b, 5a and 5b and more specifically, the lower electrode 4 (having a thickness of, for instance, 0.2 mm) comprises, for instance, a square electrode (metal) plate 4b having a size of, for instance, 9 mm$\times$9 mm and a lead terminal portion 4a outwardly and horizontally extending from one side of the square and having a size of, for instance, 8 mm (length)$\times$2 mm (width). These electrodes 3 and 4 are formed through, for instance, press-molding from a conductive metal plate.

These electrodes 3 and 4 are positioned on upper and lower sides of, for instance, a stacked electric double layer capacitor element 2 which comprises 6 unitary elements each having an outer diameter of 8 mm and a thickness of 0.5 mm so that the lead terminal portions 3a and 4a are outwardly directed in the opposite directions.

The resulting assembly as such is introduced into a lower part 6a of an injection mold provided with a pressure pin 6b and then an upper part 5a of the injection mold having a pressure pin 5b and an opening 5c for injecting a resin is put on the assembly and the lower part of the mold. While maintaining this condition by applying, to the assembly, a desired pressure ranging from 20 to 30 kg/cm$^2$, a heat-resistant resin such as polyphenylenesulfide (PPS) which has been molten by heating is injected or packed into the injection mold through the resin injection-opening 5c at a static pressure of, for instance, 600 kg/cm$^2$ and hardened and molded. The mold is removed. Thereafter, the exposed parts of the lead terminal portions 3a and 4a are formed into shapes each having an L-shaped section by, for instance, a press metal mold to give a chip type electric double layer capacitor having a rectangular shape and a size of 10 mm (length)$\times$10 mm (width)$\times$5 mm (height).

Then, 1000 electric double layer capacitors of the present invention were mounted on the surface of a printed circuit board and it was found that the rate of mounting defectives was 0%. Moreover, it was also confirmed that the effect almost identical to that described above could be obtained when the resin molding was performed by transfer molding using an epoxy resin.

As has been explained above in detail, in the electric double layer capacitor of the present invention, a pair of electrode plates each having a lead terminal portion are positioned on upper and lower faces of an electric double layer capacitor element, the resulting assembly is resin-molded or resin-armored with a heat-resistant resin while applying a desired pressure to the assembly through the upper and lower electrode plates and the lead terminal portions are formed into shapes having L-shaped sections. This structure makes it possible to easily provide chip type electric double layer capacitors capable of being surface-mounted. It has been very difficult to achieve such a surface-mounting ability by the use of the conventional capacitor structure.

What is claimed is:

1. A method for producing a chip type electric double layer capacitor comprising the steps of:

positioning an upper electrode which comprises an electrode plate and a lead terminal portion comprising a first portion downwardly extending from one side of the electrode plate and a second portion outwardly and horizontally extending from the edge of the first portion, and a lower electrode which comprises an electrode plate and a lead terminal portion outwardly and horizontally extending from one side of the electrode plate on upper and lower sides of an electric double layer capacitor element so that the lead terminal portions are outwardly directed in the opposite directions;

introducing the resulting assembly into a lower part of an injection mold provided with a pressure pin, then putting, on the lower part of the mold, an upper part of the injection mold having a pressure pin and an opening for injecting a resin;

packing a molten heat-resistant resin into the injection mold through the resin injection-opening while applying a pressure to the assembly; and hardening and molding the resin while maintaining parts of the lead terminal portions of the electrode plates outside the resin.

2. The method according to claim 1 wherein said parts of the lead terminal portions are formed into shapes each having an L-shaped section.

3. The method according to claim 1 wherein said heat-resistant resin is polyphenylenesulfide or an epoxy resin.

4. The method according to claim 1 wherein said resin-packing of the assembly is performed according to transfer molding.

5. The method according to claim 1 wherein said electric double layer capacitor element comprises a single unitary electric double layer capacitor element.

6. The method according to claim 1 wherein said electric double layer capacitor element comprises a stacked element comprising at least two unitary electric double layer capacitor elements.

7. The method according to claim 1 wherein said pressure applied to the assembly during the resin-packing ranges from 20 to 30 kg/cm$^2$.

* * * * *